United States Patent [19]

Klug

[11] Patent Number: 5,335,880
[45] Date of Patent: Aug. 9, 1994

[54] CARGO COMPARTMENT DOOR FOR AN AIRCRAFT

[75] Inventor: Heinz-Guenter Klug, Buxtehude, Fed. Rep. of Germany

[73] Assignee: Deutsche Aerospace Airbus GmbH, Hamburg, Fed. Rep. of Germany

[21] Appl. No.: 962,147

[22] Filed: Oct. 16, 1992

[30] Foreign Application Priority Data

Oct. 18, 1991 [DE] Fed. Rep. of Germany ....... 4134499
Oct. 1, 1992 [DE] Fed. Rep. of Germany ....... 4233047

[51] Int. Cl.$^5$ .............................................. B64C 1/14
[52] U.S. Cl. ............................. 244/118.3; 244/129.4; 244/129.6; 105/280; 105/284
[58] Field of Search ............... 244/129.4, 129.6, 129.5, 244/118.3; 105/280, 283, 284

[56] References Cited

U.S. PATENT DOCUMENTS

| | | |
|---|---|---|
| 3,174,712 | 3/1965 | Ricard. |
| 3,718,171 | 2/1973 | Godwin .................. 244/129.5 |
| 3,765,626 | 10/1973 | Maynard et al. ............ 244/129.5 |
| 4,440,364 | 4/1984 | Cone et al. ................ 244/129.4 |
| 4,446,524 | 5/1984 | Wendt .................... 364/463 |
| 4,453,684 | 6/1984 | Hanks ................... 244/129.5 |

FOREIGN PATENT DOCUMENTS

| | | | |
|---|---|---|---|
| 815921 | 6/1969 | Canada .................. 244/129.5 |
| WO84/01761 | 5/1984 | PCT Int'l Appl. . |
| WO89/09165 | 10/1989 | PCT Int'l Appl. . |
| 603203 | 6/1948 | United Kingdom ......... 244/129.5 |
| 1073049 | 6/1967 | United Kingdom ......... 244/129.5 |

Primary Examiner—David A. Bucci
Assistant Examiner—Virna Lissi Ansley
Attorney, Agent, or Firm—W. G. Fasse; W. F. Fasse

[57] ABSTRACT

A cargo compartment door for a passenger aircraft having about 80 to 150 seats, wherein the cargo compartment is located underneath the cabin floor, closes a loading opening (6) that extends from approximately a connection area (3, 4) between the cabin floor and the fuselage downwardly in a circumferential direction to well beyond the center plane of the fuselage. The cargo compartment door has a work platform that extends approximately horizontally in the loading position. These features provide an optimal convenience for loading and unloading such aircraft.

7 Claims, 3 Drawing Sheets

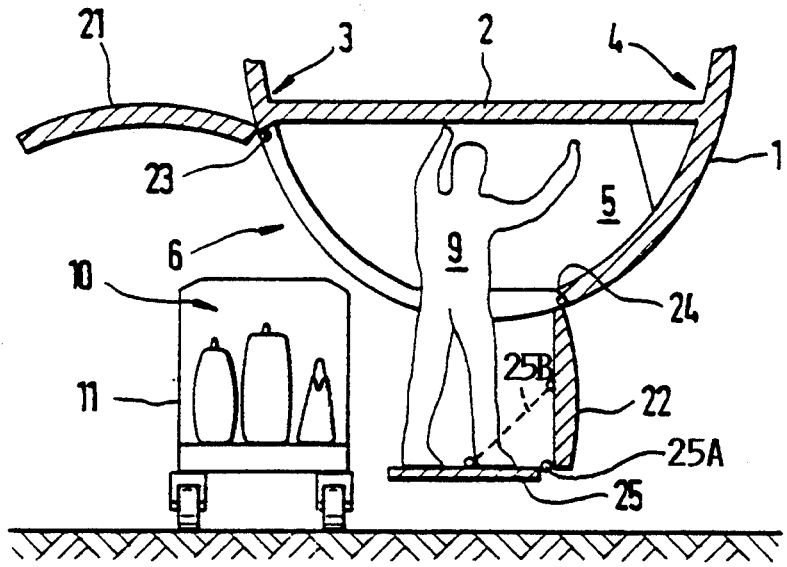
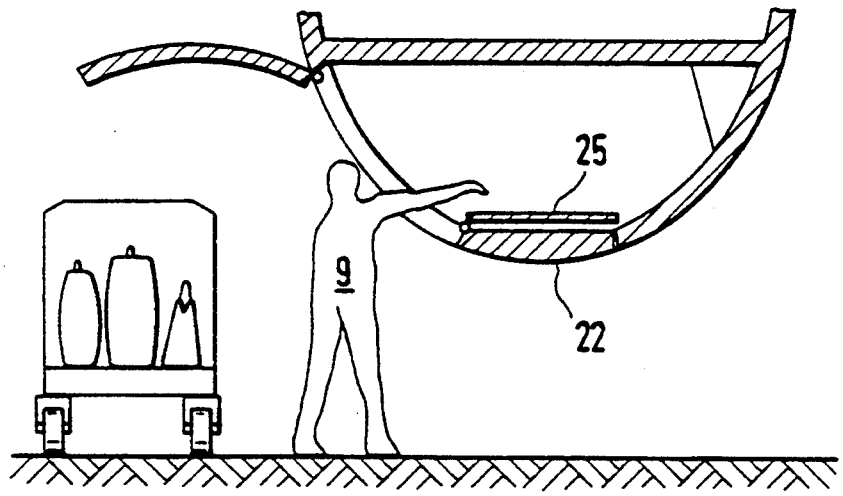
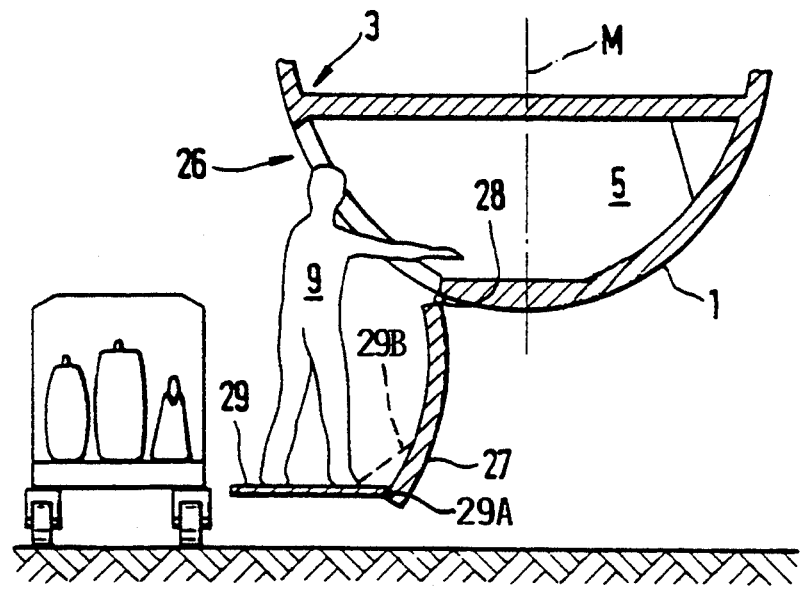

5,335,880

CARGO COMPARTMENT DOOR FOR AN AIRCRAFT

FIELD OF THE INVENTION

The invention relates to a cargo compartment door for closing a loading opening into the cargo compartment of a passenger aircraft having about 80 to 150 seats. The cargo compartment is located in the lower half of the fuselage, that is under the cabin floor.

BACKGROUND INFORMATION

In passenger aircraft of the type mentioned above, the baggage is usually loaded and transported as individual items rather than as containers. Two loading workers are always needed for loading. Once the baggage is brought on a baggage cart directly to the cargo compartment door, the first worker takes the baggage from the cart and lifts it into the cargo compartment. The second worker then stows the baggage inside the cargo compartment.

In contrast, the baggage intended for loading into a larger aircraft having more than about 150 seats, can be loaded and transported in a simple, known manner by means of baggage containers.

In order to simplify the stowing of baggage in passenger aircraft of the size having about 80 to 150 seats, loading aids in the form of conveyor belts are known which are part of the aircraft. In such a known system, the baggage is stowed directly from the door area of the cargo compartment by means of a belt system. However, a worker is still needed to sit in the door area of the cargo compartment to place the baggage which is handed to him on the conveyor belt. An unloading operation runs in the opposite direction but still requires a worker in the door area. Since the height of the cargo compartment is only 0.8 to 1.1 m, the loading and unloading of the conveyor belt can only be carried out when the worker is in a sitting position. The weight of the individual luggage pieces can be up to 20 kg which leads to an unusual bodily strain on the worker in the aircraft, especially on the spinal cord, when the worker must perform his job in a sitting position.

OBJECTS OF THE INVENTION

In view of the above it is the aim of the invention to achieve the following objects singly or in combination:

to construct a cargo compartment door for an aircraft of the type described above, so that loading and unloading of the cargo compartment can be carried out by only one person in an optimal bodily position and with the help of a conveyor in the fuselage;

to construct a door of the type mentioned above so that a door portion can be used as a standing platform; and to construct a door of the type mentioned above so that a position of the door in its open state can provide some protection against rain or snow.

SUMMARY OF THE INVENTION

These objects have been achieved in that a loading door opening extends from a connection area between the cabin floor and the fuselage structure, downwardly in a circumferential direction preferably beyond a vertical center plane through the fuselage, and wherein the door is shaped to cover such a large opening. The size of the door opening is at least 60° in the circumferential direction and preferably at least 110° as viewed downwardly and circumferentially from a cabin floor point where the cabin floor connects to the fuselage. In a preferred embodiment the cargo compartment door includes a work platform that extends nearly horizontally when the door is in the loading position.

The door may be hinged to the cabin floor point or line or it may be hinged to a fuselage floor point or line near a lowest fuselage area.

It is an important advantage of the invention that the necessary expenditure for loading and unloading man hours has been reduced, because one person can now do the work which required two persons heretofore. Simultaneously, the work place has become more comfortable, because the luggage can now be handled in a standing position rather than in a squatting position.

BRIEF DESCRIPTION OF THE DRAWINGS

In order that the invention may be clearly understood, it will now be described, by way of example, with reference to the accompanying drawings, wherein:

FIG. 4 is an example embodiment with a two component cargo compartment door, whereby each door component is individually hinged to the fuselage;

FIG. 5 shows the cargo compartment door of FIG. 4 in a partially closed condition;

FIG. 6 is a cargo compartment door for a somewhat smaller loading bay or cargo hold;

DETAILED DESCRIPTION OF PREFERRED EXAMPLE EMBODIMENTS AND OF THE BEST MODE OF THE INVENTION

Figure 1:
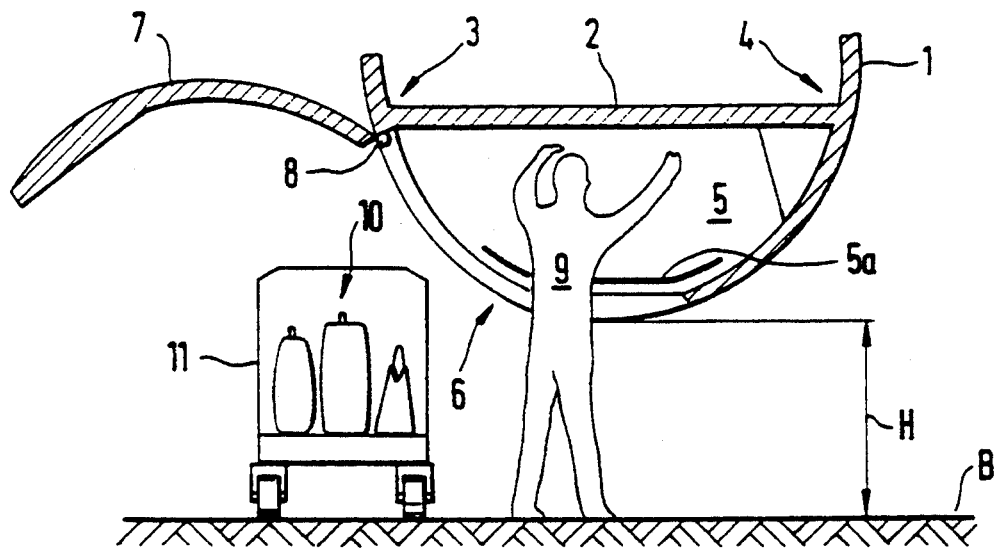
FIG. 1 shows a sectional view of one example embodiment of a one component cargo compartment door hinged to the cabin floor point, with the section plane extending perpendicularly to the longitudinal aircraft axis.

FIG. 1 shows a section through the fuselage structure of an aircraft perpendicularly to the longitudinal aircraft axis. The fuselage structure 1 has a nearly circular cross-section divided by a floor structure 2 carrying the cabin floor, laterally connected in areas 3, 4 with the fuselage structure 1. Underneath the floor structure 2, there is a cargo compartment 5 that can be loaded with baggage. The height H of the lowest point of the aircraft body or fuselage above the ground B is about 0.4 to 0.6 times the average height of a human being.

Figure 8:
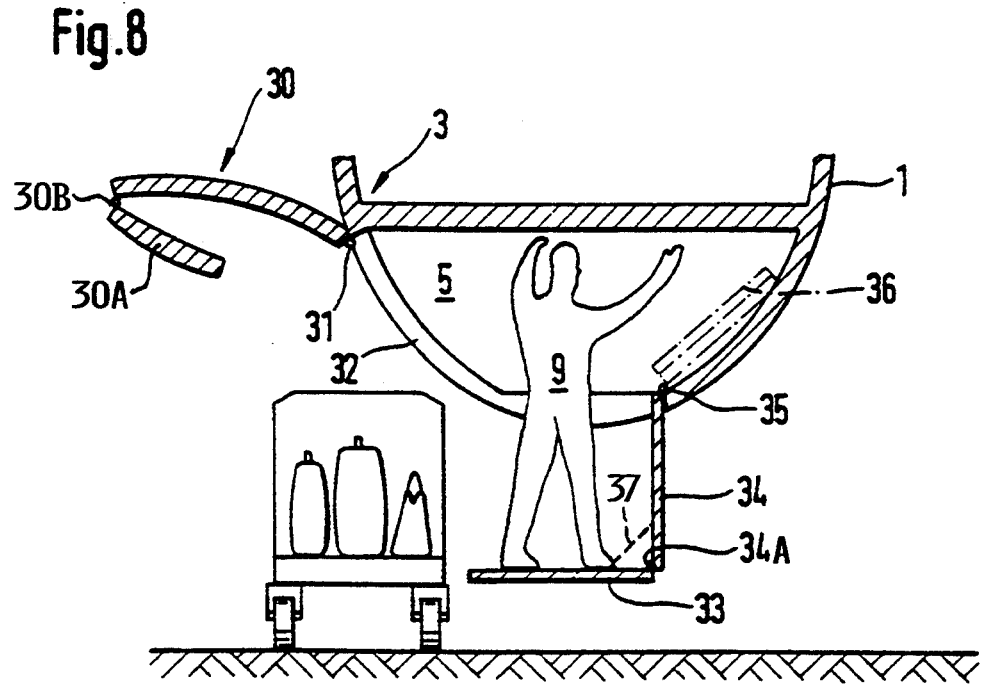
FIG. 8 shows the embodiment of FIG. 7 with a foldable door and a foldable platform.

The section in the door region of the cargo compartment 5 shows the loading door opening 6 and the cargo compartment door 7 hinged by a hinge 8 to the fuselage structure 1 in or near the floor connection area 3. The hinging axis of the hinge 8 extends nearly parallel to the flight direction which coincides with the longitudinal central axis of the aircraft. Opening of the cargo compartment door 7 is achieved by swiveling the door 7 outwardly around the axis of the hinge 8. In the shown fully open position of the door the latter is preferably held in an open position by conventional means not shown, such as a lockable piston cylinder device or the like. In this fully open position the door provides some protection against the weather for the baggage 10. The loading opening 6 stretches from approximately the left connection area 3 downwardly in a circumferential direction, preferably well beyond the vertical center plane of the fuselage 1. The opening angle in the circumferential direction is at least 60°, as in FIGS. 5 and 6, or at least 110° as in the other figures. In FIG. 8 the hinge 8 is secured to the cabin floor point in the connection area 3.

Through the present construction of the loading opening 6, a baggage handler 9 can stand upright on the ground B so that his upper body is located inside the loading compartment 5 with enough freedom of movement for his arms. Due to the widened loading opening 6, the handler can stand in an upright position and take a piece of baggage 10 from an advantageously placed baggage cart 11 to place it on a conveyor belt 5A in the cargo or baggage compartment 5. Optimal conditions are achieved when the bottom of the fuselage contour, as shown, runs at about the waistline of the handler 9.

In the embodiment of the cargo compartment door 7 shown in FIG. 1, the advantageous relationship between the bottom of the fuselage contour and the waistline of the handler 9 happens to be when the waistline is at the same level as the height H.

Figure 2:
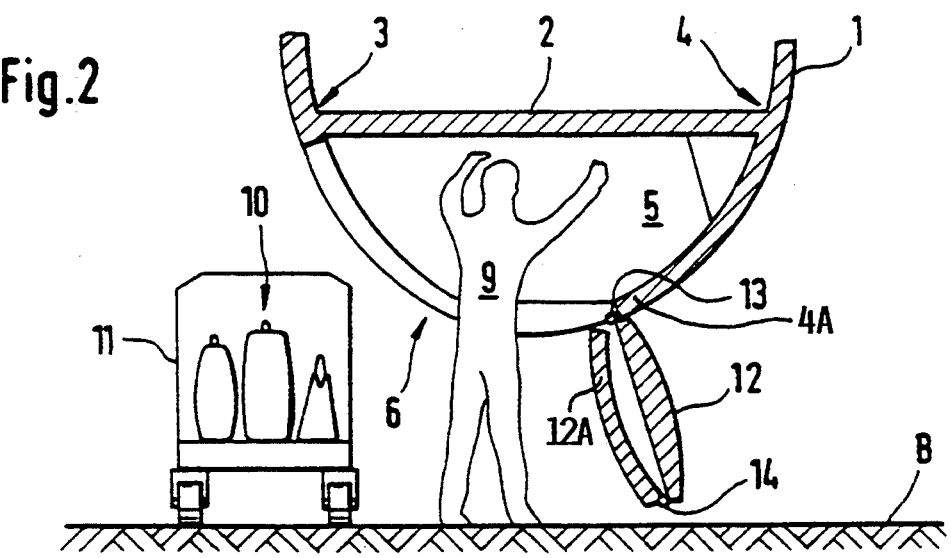
FIG. 2 is a view similar to FIG. 1, but showing another example embodiment of a cargo compartment door with two foldable components hinged to each other and to the fuselage floor point.

FIG. 2 shows another example embodiment of the present invention, whereby the same reference numbers 1 to 6 and 9 to 11 refer to the same items as in FIG. 1. The luggage compartment door 12 in FIG. 2 has two components 12 and 12A foldable with the aid of a hinge 14 and jointed by a hinge 13 to the fuselage structure 1 in the region 4A of the loading opening 6 approximately diagonally across from the connection area 3. Region 4A defines the fuselage floor point where hinge 13 is secured to the fuselage. The foldability of the cargo compartment door components 12 and 12A is achieved by the hinge 14 having a hinging axis approximately parallel to the flight direction. Here again, the loading opening 6 extends from approximately the connection area 3 to well beyond the vertical center plane of the fuselage with an opening angle of about 110°, so that the working conditions are basically the same as those found in the embodiment of FIG. 1. In the shown open position the door 12, 12A provides some side wind protection for the handler 9. The lowest point of the fuselage section above the ground B is also approximately the height H as in FIG. 1. Due to the foldability of the cargo compartment door 12, 12A, it cannot be damaged by ground vehicles when in the open condition. Depending on the geometric conditions of the aircraft, various embodiments of the cargo compartment door 7, 12 are possible.

Figure 3:
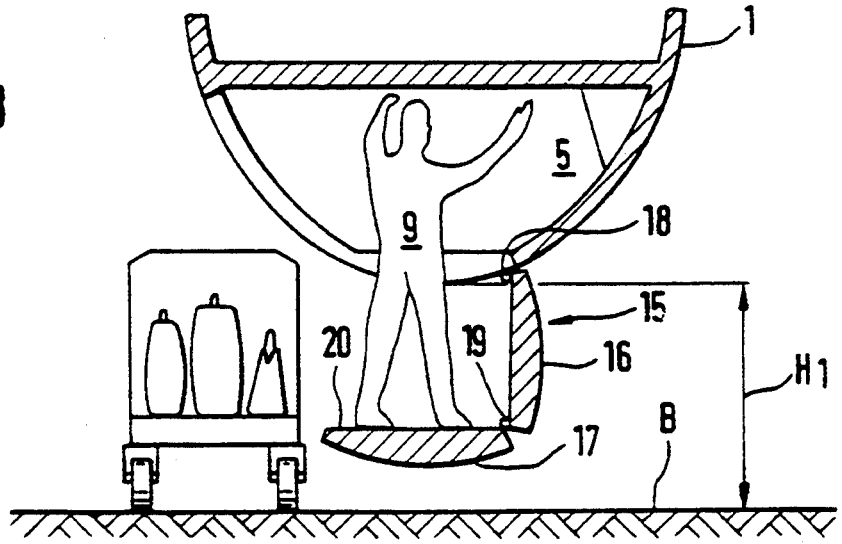
FIG. 3 shows the cargo compartment door of FIG. 2 modified by a work platform forming part of one door component hinged to the other door component.

FIG. 3 shows an embodiment of the present invention, wherein the lowest point of the fuselage section above the ground B, when compared to the examples of FIG. 1 and FIG. 2 has a larger elevation $H_1$. The cargo compartment door 15 comprises a first section or component 16 hinged to the fuselage structure 1 by a hinge 18 and a closing component or section 17 that is freely swivelable relative to the section 16 in the open position within suitable angular limits determined by conventional, pivotable braces not shown. For this purpose the door component 16 that is hinged to the fuselage structure 1 at 18 is hinged to the closing component 17 through a swivel hinge 19. The rotation axis of both hinges 18 and 19 run approximately parallel to the flight direction. Due to the larger height $H_1$, a handler 9 standing on the ground B would be in a disadvantageous position relative to the cargo compartment 5. This disadvantage is overcome in that the closing door component 17, that is free in the open position, comprises an approximately horizontal work platform 20 when section or component 17 is in the loading position, in which the structure is firmly held by the above mentioned braces, not shown. To produce optimal working conditions the work platform 20 is arranged relative to the fuselage structure 1, so that the lowest point of the fuselage contour is once again at about the waistline of the loading worker.

FIG. 4 shows an embodiment of the present invention, wherein the cargo compartment door comprises an upper door section 21 and a lower door section 22. The upper section 21 is hinged to the fuselage structure 1 by an upper hinge 23. The lower section 22 is hinged to the fuselage 1 by a lower hinge 24. The loading opening 6 extends from the left connection area 3 downwardly in a circumferential direction to well beyond the center plane of the fuselage. A work platform 25 is foldably hinged at 25A to the lower door section 22 so that the handler 9 can conveniently remove the individual luggage items 10 from the cart 11 to stow them in the cargo compartment 5 under principally the same working conditions as in the embodiment of FIG. 3. The embodiment described here has the advantage, however, that the cargo compartment 5 can continue to be loaded after the lower structure 22 is closed. A brace 25B such as a chain, piston cylinder device, bracket, or the like firmly holds the platform 25 in the working position shown in FIG. 4.

FIG. 5 shows the embodiment of FIG. 4 with the lower door section 22 in a closed position. The work platform 25 thereby becomes part of the inner wall of the cargo compartment 5, whereby an additional loadable floor area is formed in the cargo compartment 5 to hold additional pieces of luggage.

An essential characteristic of all aforementioned embodiments is a loading opening 6 that extends from approximately the connection area 3 of the cabin floor and the fuselage structure 1 downwardly in a circumferential direction to well beyond the center plane of the fuselage.

FIG. 6 shows another embodiment of the present invention with a smaller loading opening 26, which extends approximately from the left connection area 3 to only short of the center plane M of the fuselage, whereby the opening has an opening angle of about 60°. However, the cargo compartment door 27 is hinged at 28 to the fuselage structure 1 in the floor area of the cargo compartment 5. The hinge 28 limits the tilting angle of the door 27 which is equipped with a foldable work platform 29 hinged at 29A to the free edge of the door 27 in an open condition. A brace 29B holds the platform 29 horizontally in the working condition. Thus, basically the same working condition is achieved as in the embodiment of FIG. 5, whereby however, it is an advantage that the height of the fuselage over the ground can now be larger, due to the work platform 29. Since accessibility to the cargo compartment for the handler 9 is not as great as in the embodiments of FIGS. 1 to 4, use of a loading aid, such as a conveyor belt, not shown in FIG. 6, in the aircraft makes sense. When the loading process has been completed, the work platform is folded upwardly and secured in its resting position against the inside of the door 27. Then the cargo compartment door 27 is closed and locked.

In the embodiment of FIG. 1, it is possible that the relatively large single component door 7 is in the way of other ground traffic, especially when space on the ground is at a premium. Therefore, it may be preferred to divide the door 7 into two door components as shown in FIGS. 7 and 8.

Figure 7:
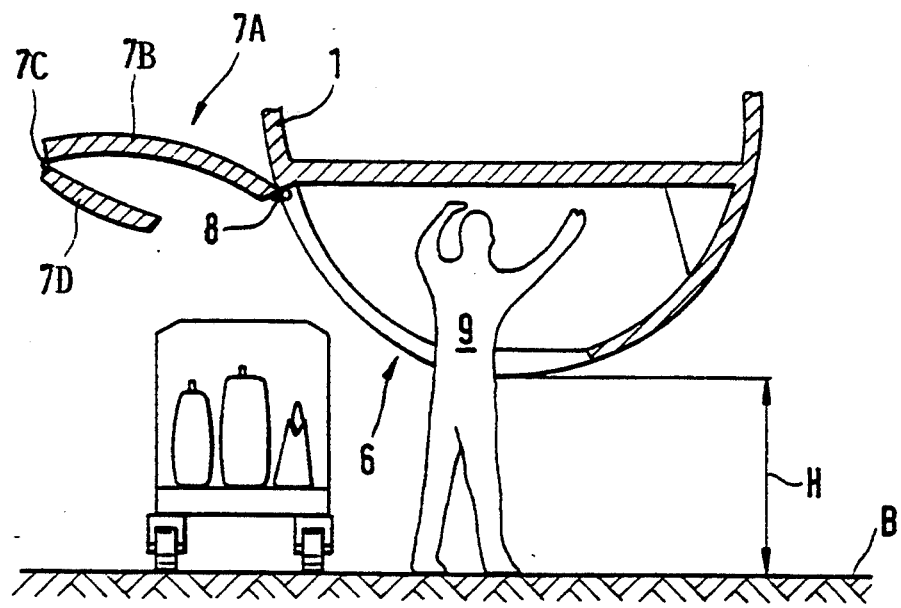
FIG. 7 is a view similar to that of FIG. 1, but showing, an example embodiment with two components hinged to each other and to the cabin floor point.

FIG. 7 shows an embodiment in which the door 7A has two components 7B and 7D hinged to each other at 7C. In FIG. 7 again the lowest point of the fuselage is at an elevation H above the ground B. Thus, the working conditions for the operator 9 are the same as in FIG. 1. The door 7A for closing the loading opening 6 is hinged to the fuselage by a hinge 8 substantially as in FIG. 1 at the cabin floor point defined in the connection area 3. The hinging axis extends approximately in parallel to the longitudinal axis of the body or fuselage 1. During opening, as the flap door 7A swings outwardly and clockwise, the door component 7D simultaneously swings counterclockwise around the hinge 7C toward the inwardly located door component 7B. As a result of this foldable construction of the flap door 7A, the latter does not reach far away from the aircraft body, and hence does not require as much floor space as the embodiment of FIG. 1. Thus, possibilities of damage to the door by passing traffic is substantially reduced.

FIG. 8 illustrates a further example embodiment in which the foldable flap door 30 is hinged by a hinge 31 to the cabin floor point defined in the connection area 3. The loading opening 32 extends counterclockwise from the hinge 31 well beyond the vertical central plane through the fuselage, namely all the way to the hinge 35. A working platform 33 is connected through a strut 34 that is hinged by the hinge 35 to the fuselage connection point and carries at its lower end a platform 33 hinged to the strut by a hinge 34A. As shown, the platform 33 is in use by the operator 9. When the platform is not used, for example, during flight, it is folded inwardly into the position 36 shown in dashed lines inside the fuselage freight space 5.

If the freight space 5 is to be unloaded, first the flap 30 with its flap section 30A hinged to the flap 30 by the hinge 30B is opened counterclockwise and clockwise as described above. Once the flap 30 is opened, the working platform 33 is pulled out through the loading opening 32 and folded downwardly into the shown working position in which it may be locked by a chain 37 or the like. The just described construction has the advantage that the working platform 33 is not part of the flap 30. Thus, any damage that might happen to the platform 33 does not adversely affect the operability of the flap door 30, 30A.

The just described door constructions with the flap doors 7A and 30 are equally suitable for use when the loading opening 6 or 32 is less than an angle of about 110°. This type of door construction is suitable when the door opening angle is for example less than 90°.

All suitable conventional structures can be used to close and lock the cargo compartment door and to integrate the cargo compartment door into the fuselage, conventional means can be used.

Although the invention has been described with reference to specific example embodiments it will be appreciated that it is intended to cover all modifications and equivalents within the scope of the appended claims.

What I claim is:

1. A combination comprising a medium sized aircraft fuselage and a cargo compartment door structure for said aircraft fuselage, a floor connected to said fuselage at lateral connecting areas, said floor dividing said fuselage into a passenger cabin above said floor and into a cargo compartment below said floor, said fuselage having a vertical central plane passing longitudinally through said fuselage perpendicularly to said floor, a curved door opening in said fuselage, said curved door opening extending through an angular range beginning at one of said connecting areas and reaching circumferentially and downwardly at least beyond said vertical central plane to form an opening sector having a center where said vertical central plane and said floor intersect to form an opening angle of more than 90°, a curved door for covering said curved door opening in a sealed manner, a first hinge securing said curved door to said fuselage, and a conveyor belt (5A) in said cargo compartment, said conveyor belt extending toward said door opening for loading baggage onto said conveyor belt through said curved door opening, wherein said curved door comprises at least two foldable door sections, and a second hinge foldably interconnecting said door sections, and wherein a lower door section of said at least two foldable door sections (17) forms an inwardly facing surface constructed as a stepping platform (20) extending substantially horizontally when said door is open, and a brace for holding said lower door section in a fixed substantially horizontal position when said door is open, so that said inwardly facing surface of said lower door section can be used as a stepping platform when said door is open.

2. The combination of claim 1, wherein said opening angle is at least about 110° for facilitating said loading onto said conveyor belt.

3. The combination of claim 1, wherein said first and second hinges have hinging axes extending substantially in parallel to said central plane.

4. The combination of claim 1, wherein said passenger cabin has about 80 to 150 seats.

5. The combination of claim 1, wherein said second hinge comprises a foldable hinge.

6. A combination comprising a medium sized aircraft fuselage and a cargo compartment door structure for said aircraft fuselage, a floor connected to said fuselage at lateral connecting areas, said floor dividing said fuselage into a passenger cabin above said floor and into a cargo compartment below said floor, said fuselage having a vertical central plane passing longitudinally through said fuselage, a curved door opening in said fuselage, said curved door opening extending through an angular range beginning at one of said connecting areas and reaching circumferentially and downwardly at least beyond said vertical central plane to form an opening sector having a center where said vertical central plane and said floor intersect to form an opening angle of more than 90°, a curved door for covering said curved door opening in a sealed manner, and a first hinge positioned along a lower edge of said curved door opening for securing said curved door to said fuselage, said curved door comprising a first door section connected by said first hinge to said fuselage along said lower edge of said door opening and a second door section, a second hinge connecting said second door section to said first door section, and brace means for holding said second door section in a fixed horizontal position when said curved door is open so that said second door section can be used as a stepping platform.

7. A combination comprising a medium sized aircraft fuselage and a cargo compartment door structure for said aircraft fuselage, a floor connected to said fuselage at lateral connecting areas, said floor dividing said fuselage into a passenger cabin above said floor and into a cargo compartment below said floor, said fuselage having a vertical central plane passing longitudinally through said fuselage, a curved door opening in said fuselage, said curved door opening extending through an angular range of more than 90° beginning at one of said connecting areas and reaching circumferentially and downwardly at least beyond said vertical central plane, curved door means for covering said curved door opening in a sealed manner, said curved door means comprising a first door section and a second door section, a first hinge securing said first door section to an upper edge of said curved door opening, a second hinge securing said second door section to said first door section, whereby said curved door means are foldable for opening said curved door means and expandable for closing said curved door opening, said combination further comprising brace means for holding said second door section in a fixed horizontal position when said curved door is open so that said second door section can be used as a stepping platform.

* * * * *